(12) United States Patent
Sun et al.

(10) Patent No.: US 12,244,226 B2
(45) Date of Patent: Mar. 4, 2025

(54) VOLTAGE-BALANCING NON-ISOLATED HIGH-STEP-DOWN-RATIO POWER SUPPLY

(71) Applicant: VIRGINIA TECH INTELLECTUAL PROPERTIES, INC., Blacksburg, VA (US)

(72) Inventors: Keyao Sun, Blacksburg, VA (US); Rolando Burgos, Blacksburg, VA (US); Dushan Boroyevich, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 215 days.

(21) Appl. No.: 17/933,312

(22) Filed: Sep. 19, 2022

(65) Prior Publication Data

US 2023/0369969 A1 Nov. 16, 2023

Related U.S. Application Data

(60) Provisional application No. 63/264,307, filed on Nov. 19, 2021.

(51) Int. Cl.
 *H02M 3/158* (2006.01)
 *H02M 1/00* (2006.01)
 *H02M 3/00* (2006.01)

(52) U.S. Cl.
 CPC ......... *H02M 3/015* (2021.05); *H02M 1/0025* (2021.05); *H02M 3/158* (2013.01)

(58) Field of Classification Search
 CPC ..... G05F 1/00; G05F 1/10; G05F 1/12; G05F 1/46; G05F 1/455; G05F 1/45;
 (Continued)

(56) References Cited

U.S. PATENT DOCUMENTS 7,825,638 B2 * 11/2010 Bolz ..................... H02J 7/0016
 320/167
9,397,548 B2 * 7/2016 Li ........................... H02M 3/06
 (Continued)

FOREIGN PATENT DOCUMENTS

DE  102012015621 A1 * 2/2014 ................ H02J 7/00
EP  3675345 A1 * 7/2020 ............ H02M 3/156
 (Continued)

OTHER PUBLICATIONS

English Translation of DE-102012015621 (Year: 2012).*
 (Continued)

*Primary Examiner* — Sean Kayes
*Assistant Examiner* — Nusrat Quddus
(74) *Attorney, Agent, or Firm* — Perilla Knox & Hildebrandt LLP; Jonathan A. Paulis

(57) ABSTRACT

Topologies and configurations of step-down power supplies including unidirectional balancing cells are described. In one example, a step-down power supply includes an input and an output, a string of series-connected capacitors, and a plurality of unidirectional balancing cells coupled to the capacitors in the string of series-connected capacitors. A first balancing can be configured to transfer power, unilaterally, in a first direction among at least two capacitors in the string of series-connected capacitors, and a second balancing cell can be configured to transfer power, unilaterally, in a second direction among at least two capacitors in the string of series-connected capacitors, where the first direction is different than the second direction. The power supply can also include a gate controller for a balancing cell. The gate controller generates switching control signals at a first switching frequency that is decoupled from a resonant frequency of a balancing branch in the balancing cell.

20 Claims, 11 Drawing Sheets

(58) Field of Classification Search
CPC ... G05F 1/445; G05F 1/66; G05F 1/40; G05F
1/42; G05F 1/44; G05F 1/462; G05F
1/52; G05F 1/56; G05F 3/10; G05F 3/16;
G05F 3/18; G05F 3/185; G05F 3/20;
G05F 3/26; G05F 3/30; G05F 3/205;
G05F 3/22; G05F 3/24; G05F 3/222;
G05F 3/242; G05F 3/225; G05F 3/227;
G05F 3/245; G05F 3/247; G05F 3/262;
G05F 3/265; G05F 3/267; G05F 1/575;
H02M 5/2573; H02M 1/081; H02M
5/293; H02M 7/12; H02M 3/10; H02M
3/125; H02M 3/13; H02M 3/135; H02M
3/145; H02M 3/15; H02M 3/155; H02M
3/156; H02M 3/158; H02M 3/1588;
H02M 2003/1566; H02M 3/1582; H02M
2003/1557; H02M 3/1584; H02M 3/285;
H02M 3/33561; H02M 7/49; H02M
1/045; H02M 7/006; H02M 7/06; H02M
7/068; H02M 7/153; H02M 7/10; H02M
1/088; H02M 7/103; H02M 7/106; H02M
7/19; H02M 7/08; H02M 7/17; H02M
2001/007; H02M 7/493; H02M 7/53806;
H02M 7/5381; H02M 7/483; H02M
7/217; H02M 7/538466; H02M 7/5387;
H02M 7/53871; H02M 7/53873; H02M
7/53875; H02M 1/084; H02M 1/0845;
H05B 39/048; B23K 11/24; H04B
2215/069; H02J 3/46; H02J 3/38
See application file for complete search history.

(56) References Cited

U.S. PATENT DOCUMENTS

| | | | | |
|---|---|---|---|---|
| 9,413,221 | B1* | 8/2016 | Kim | H02M 7/217 |
| 9,419,522 | B1* | 8/2016 | Khaligh | H02M 3/1582 |
| 10,075,067 | B2* | 9/2018 | Wu | H02M 3/07 |
| 11,201,562 | B1* | 12/2021 | Wasynczuk | H02M 7/4811 |
| 11,437,929 | B2* | 9/2022 | Ilic | H02M 1/083 |
| 11,463,018 | B2* | 10/2022 | Glovinsky | H02M 1/0095 |
| 2004/0135546 | A1* | 7/2004 | Chertok | B60L 58/18 |
| | | | | 320/118 |
| 2006/0139021 | A1* | 6/2006 | Taurand | H02M 3/158 |
| | | | | 323/290 |
| 2010/0253286 | A1* | 10/2010 | Sutardja | H02J 7/0014 |
| | | | | 320/120 |
| 2010/0308660 | A1* | 12/2010 | Willis | H02J 1/102 |
| | | | | 307/77 |
| 2013/0015821 | A1* | 1/2013 | Kim | H02J 7/0019 |
| | | | | 320/128 |
| 2014/0145509 | A1* | 5/2014 | Willis | H02J 3/381 |
| | | | | 307/77 |
| 2015/0131337 | A1* | 5/2015 | Gabrielsson | H02M 3/33507 |
| | | | | 363/21.02 |
| 2015/0188362 | A1* | 7/2015 | Mondal | H02J 9/062 |
| | | | | 307/52 |
| 2016/0190813 | A1* | 6/2016 | Kumar | H02M 3/158 |
| | | | | 307/18 |
| 2017/0085183 | A1* | 3/2017 | Notsch | H02M 1/44 |
| 2018/0337610 | A1* | 11/2018 | Leong | H02M 1/083 |
| 2019/0267889 | A1* | 8/2019 | McBryde | H02M 7/537 |
| 2020/0244175 | A1* | 7/2020 | Mahdavikhah-Mehrabad | |
| | | | | H02M 3/33569 |
| 2021/0066924 | A1* | 3/2021 | Urabe | H02J 3/46 |
| 2021/0203222 | A1* | 7/2021 | Ilic | H02M 7/537 |
| 2021/0265912 | A1* | 8/2021 | Zehetbauer | H02M 3/155 |
| 2022/0360196 | A1* | 11/2022 | Ilic | H02M 1/088 |
| 2023/0089387 | A1* | 3/2023 | Wijekoon | H02M 3/158 |
| | | | | 323/271 |
| 2023/0216399 | A1* | 7/2023 | Wijekoon | H02M 7/4833 |
| | | | | 323/271 |
| 2023/0318434 | A1* | 10/2023 | Xu | H02M 1/0095 |
| | | | | 363/15 |
| 2024/0162836 | A1* | 5/2024 | Ilic | H02M 3/07 |

FOREIGN PATENT DOCUMENTS

| | | | | |
|---|---|---|---|---|
| EP | 4246790 | A1 * | 9/2023 | H02J 3/381 |
| EP | 4250546 | A1 * | 9/2023 | H02M 1/4225 |
| WO | WO-2019145015 | A1 * | 8/2019 | H02J 3/381 |

OTHER PUBLICATIONS

B. Hu, Z. Wei, H. Li, D. Xing, R. Na, J. A. Brothers, and J. Wang, "A gate drive with active voltage divider based auxiliary power supply for medium voltage sic device in high voltage applications," in 2018 IEEE Applied Power Electronics Conference and Exposition (APEC), 2018, pp. 2979-2985.

G. Rizzoli, L. Zarri, J. Wang, Z. Shen, R. Burgos, and D. Boroyevich, "Design of a two-switch flyback power supply using 1.7 kv sic devices for ultra-wide input-voltage range applications," in 2016 IEEE Energy Conversion Congress and Exposition (ECCE), 2016, pp. 1-5.

H. D. Torresan and D. G. Holmes, "A high voltage converter for auxiliary supply applications using a reduced flying capacitor topology," in 2005 IEEE 36th Power Electronics Specialists Conference, 2005, pp. 1220-1226.

J. Liu, S. Zhong, J. Zhang, Y. Ai, N. Zhao, and J. Yang, "Auxiliary power supply for medium- /high-voltage and high-power solid-state transformers," IEEE Transactions on Power Electronics, vol. 35, No. 5, pp. 4791-4803, 2020.

J. Won, G. Jalali, X. Liang, C. Zhang, S. Srdic, and S. M. Lukic, "Auxiliary power supply for medium-voltage power converters: Topology and control," IEEE Transactions on Industry Applications, vol. 55, No. 4, pp. 4145-4156, 2019.

K. B. Leandro, M. B. Tiago, C. Rech, P. J. Renes, and C. Alexandre, "A high input voltage and high step-down ratio double-ended flyback converter," in 2015 IEEE 13th Brazilian Power Electronics Conference and 1st Southern Power Electronics Conference (COBEP/SPEC), 2015, pp. 1-6.

K. Sun, N. Yan, X. Lin, R. Burgos and D. Boroyevich, "A Scalable Self-Powered Balancing Circuit for High-Step-Down-Ratio Auxiliary Power Supply," in IEEE Transactions on Power Electronics, vol. 39, No. 1, pp. 236-244, Jan. 2024, doi: 10.1109/TPEL.2023.3321583.

K. Sun, X. Lin, J. Wang, R. Burgos and D. Boroyevich, "A Scalable Voltage-Balancing-Circuit based Non-Isolated High-Step-Down-Ratio Auxiliary Power Supply," 2021 IEEE Applied Power Electronics Conference and Exposition (APEC), Phoenix, AZ, USA, 2021, pp. 1803-1808, doi: 10.1109/APEC42165.2021.9487445.

K. Sun, Y. Xu, J. Wang, R. Burgos, and D. Boroyevich, "Insulation design of wireless auxiliary power supply for medium voltage converters," IEEE Journal of Emerging and Selected Topics in Power Electronics, pp. 1-1, 2020.

M. Kasper, D. Bortis, and J. W. Kolar, "Novel high voltage conversion ratio "rainstick" dc/dc converters," in 2013 IEEE Energy Conversion Congress and Exposition, 2013, pp. 789-796.

Sheng Zong, Qianlai Zhu, Wensong Yu, and A. Q. Huang, "Auxiliary power supply for solid state transformer with ultra high voltage capacitive driving," in 2015 IEEE Applied Power Electronics Conference and Exposition (APEC), 2015, pp. 1008-1013.

T. Meng, Y. Song, Z. Wang, H. Ben, and C. Li, "Investigation and implementation of an input-series auxiliary power supply scheme for highinput-voltage low-power applications," IEEE Transactions on Power Electronics, vol. 33, No. 1, pp. 437-447, 2018.

T. Modeer, S. Norrga, and H. Nee, "High-voltage tapped-inductor buck converter utilizing an autonomous high-side switch," IEEE Transactions on Industrial Electronics, vol. 62, No. 5, pp. 2868-2878, 2015.

X. Chen, W. Chen, X. Yang, Y. Han, X. Hao, and T. Xiao, "Research on a 4000-v-ultrahigh-input-switched-mode power supply using

(56) References Cited

OTHER PUBLICATIONS series connected mosfets," IEEE Transactions on Power Electronics, vol. 33, No. 7, pp. 5995-6011, 2018.

* cited by examiner

VOLTAGE-BALANCING NON-ISOLATED HIGH-STEP-DOWN-RATIO POWER SUPPLY

CROSS REFERENCE TO RELATED APPLICATIONS

This application claims the benefit of and priority to U.S. Provisional Application No. 63/264,307, filed Nov. 19, 2021, titled "SCALABLE VOLTAGE-BALANCING CIRCUIT BASED NON-ISOLATED HIGH-STEP-DOWN-RATIO AUXILIARY POWER SUPPLY," the entire contents of which is hereby incorporated herein by reference.

GOVERNMENT LICENSE RIGHTS

This invention was made with government support under Grant No. N00014-16-1-2956 awarded by the Office of Naval Research. The government has certain rights in the invention.

BACKGROUND

Many electronic devices and systems rely upon power at a constant, defined, and regulated voltage for proper operation. In that context, power supplies and power conversion devices and systems are relied upon to convert electric power or energy from one form to another. A power supply or power converter is an electrical or electro-mechanical device or system for converting electric power or energy from one form to another. As examples, power converters can convert alternating current (AC) power into direct current (DC) power, convert DC power to AC power, change or vary the characteristics (e.g., the voltage characteristics, current characteristics, etc.) of power, or offer other types of power conversion. A power supply or power converter can be as simple as a transformer, but many power converters have more complicated designs and are tailored for a variety of applications and operating specifications.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Power supplies and power converters are important components for reliable system operation, by providing stable voltage and power for gate drivers, sensors, controllers, and other components. A wide range of power supplies and topologies of power supplies are known, and a range of different considerations may be evaluated in the selection and design of a power supply based on the needs for the application. Example considerations include scalability, stability, the need for feedback control, the need for precise switching synchronization of switching devices in the power supply, the need for and use of galvanic isolation, the extent of electromagnetic interference generated by the power supply, the extent of voltage step-down needed, the complexity of powering and controlling individual power cells in the power supply, the breakdown voltages of switching devices in the power supply, and other concerns.

According to various aspects of the embodiments, new topologies and configurations of step-down power supplies including unidirectional balancing cells are described. More particularly, a number of non-isolated high-step-down-ratio auxiliary power supply solutions are described for medium-voltage and high-voltage converters. Different from the other voltage-balancing-circuit designs, the examples described herein include unidirectional balancing cells with fewer active device and driving circuits. The size of the resonant tank in the balancing cells can also be minimized, as the unidirectional balancing cells permit decoupling of the switching frequency of the cells from the LC resonant frequency of the resonant tank. The balancing cells can also be connected in an interleaved manner instead of direct series connection. In this way, each balancing cell is self-governed and decoupled from other cells, which reduces or eliminates the need for complicated synchronization schemes and central controllers and improves reliability. The solution, therefore, becomes a scalable and flexible solution for step-down power conversion of high input voltages.

In one example, a step-down power supply or converter includes an input and an output, a string of series-connected capacitors, and a plurality of unidirectional balancing cells coupled to the capacitors in the string of series-connected capacitors. A first balancing can be configured to transfer power, unilaterally, in a first direction among at least two capacitors in the string of series-connected capacitors, and a second balancing cell can be configured to transfer power, unilaterally, in a second direction among at least two capacitors in the string of series-connected capacitors, where the first direction is different than the second direction. The power supply can also include a gate controller for a balancing cell. The gate controller generates switching control signals at a first switching frequency that is decoupled from a resonant frequency of a balancing branch in the balancing cell.

Figure 1:
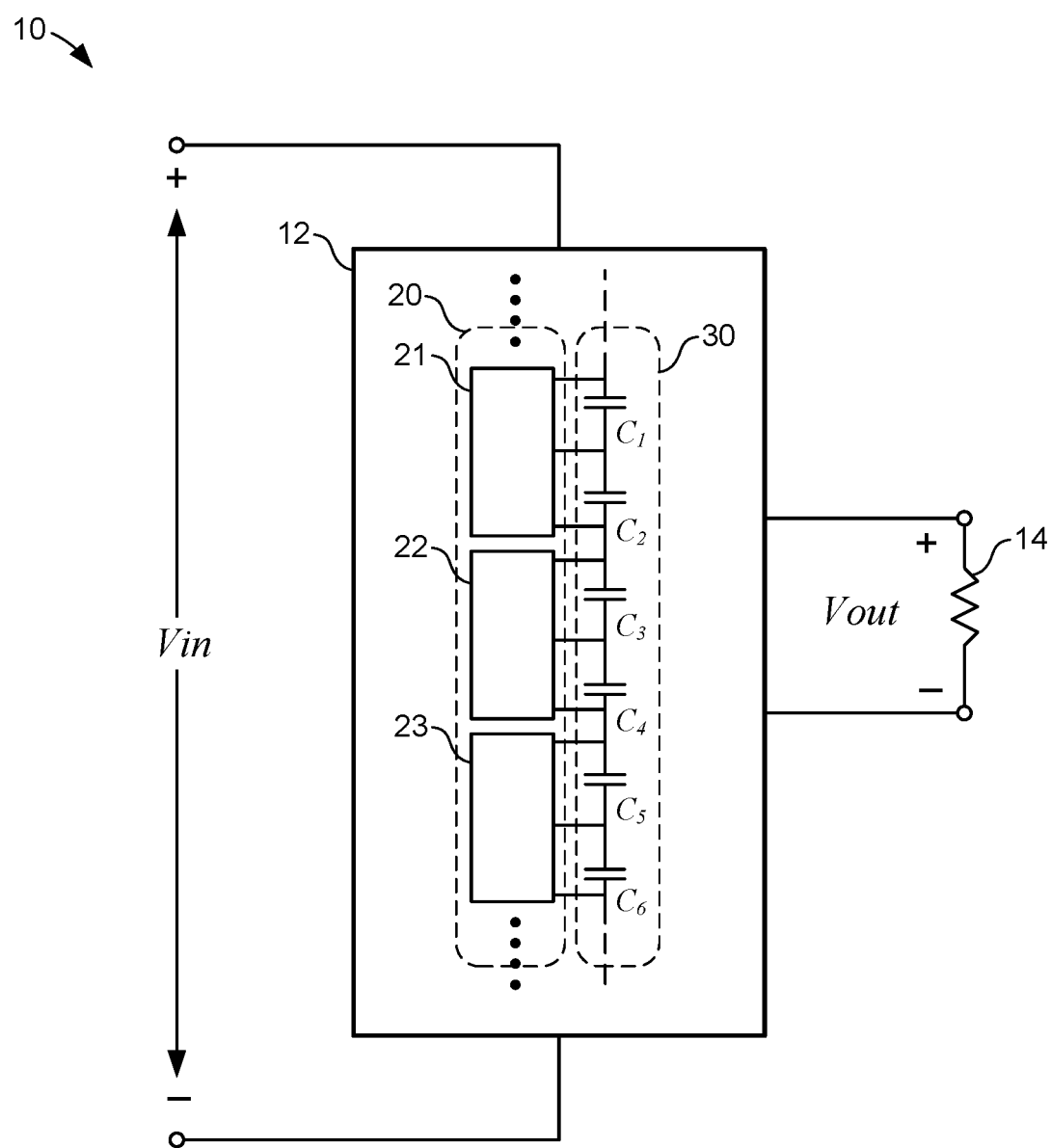
FIG. 1 illustrates an example power converter system according to various aspects of the embodiments described herein.

Turning to the drawings, FIG. 1 illustrates an example power system 10 according to various aspects of the embodiments described herein. The power system 10 includes an input, an output, a step-down power supply 12 (also "power supply 12") electrically coupled between the input and the output, and a load 14. The power system 10 is illustrated as a representative example in FIG. 1, to explain certain concepts of power supplies and converters according to the embodiments described herein. The power system 10 is not exhaustively illustrated, and the power system 10 can include additional components. Additionally, one or more of the components of the power system 10 shown in FIG. 1 can be omitted or replaced. For example, the load 14 is illustrated in FIG. 1 as a resistive load, but the output of the power supply 12 can be coupled to other types of loads, including later-stage power supplies or power converters, gate drivers, sensors, controllers, and other loads.

The power supply 12 is electrically coupled between the input and the output. An input voltage Vin is applied at the input to the power supply 12, and the power supply 12 provides a stepped-down output voltage Vout at the output. The power supply 12 is a non-isolated step-down power supply. The power supply 12 offers a scalable solution for stepping down higher input voltages to lower output voltages, with internal voltage balancing, using a topology that facilitates relatively simple control techniques and other advantages described herein.

Among other components, the power supply 12 includes a balancing string 20 and a capacitor string 30. The balancing string 20 includes the balancing cells 21-23, among possibly others. The capacitor string 30 includes the capacitors $C_1$-$C_6$, among possibly others. The power supply 12 can include any number of balancing cells 21-23 in the balancing string 20 and capacitors $C_1$-$C_6$ in the capacitor string 30, depending on the step-down ratio of the power supply 12, the potentials of Vin and Vout, the breakdown voltages of the switching devices in the balancing cells 21-23, and other factors.

In operation, the balancing cells 21-23 are configured to switch charge from the input of the power supply 12 among the capacitors $C_1$-$C_6$ in the capacitor string 30. Through switching operations performed by the balancing cells 21-23, the balancing cells 21-23 are configured to move charge among the capacitors $C_1$-$C_6$, individually, in the capacitor string 30. As compared to the input voltage Vin, the power supply 12 provides an output voltage Vout of lower potential (i.e., of lower voltage) across each of the capacitors $C_1$-$C_6$. The output of the power supply 12 can be taken across any one of the capacitors $C_1$-$C_6$. Additional examples of the power supply 12 are described below with reference to FIGS. 5A and 5B.

Figure 2A:
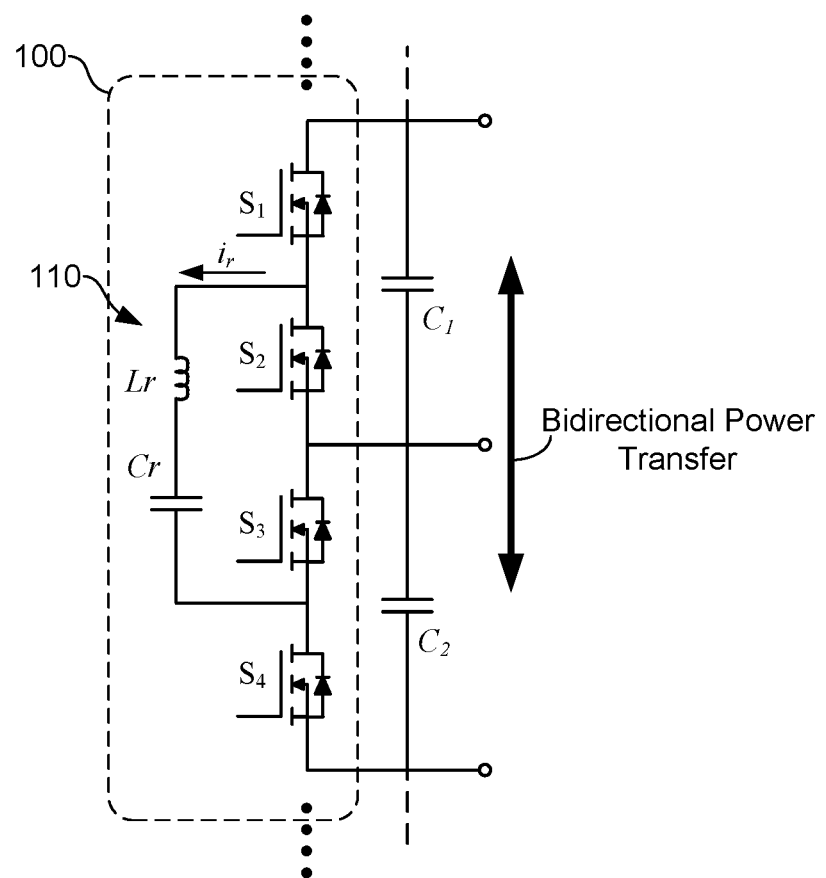
FIG. 2A illustrates an example bidirectional balancing cell according to aspects of the embodiments described herein.

FIG. 2A illustrates an example balancing cell 100 according to aspects of the embodiments described herein. One or more of the balancing cells 21-23, among possibly others, in the balancing string 20 shown in FIG. 1 can be implemented as the balancing cell 100. The balancing cell 100 includes a first switching device $S_1$, a second switching device $S_2$, a third switching device $S_3$, and a fourth switching device $S_4$. The balancing cell 100 also includes a branch 110 (also "resonant branch"), including a resonant inductor Lr and a resonant capacitor Cr. The capacitors $C_1$ and $C_2$ are part of a capacitor string, similar to the capacitor string 30 of the power supply 12 shown in FIG. 1.

The switching devices $S_1$-$S_4$ can be embodied as insulated-gate bipolar transistors (IGBTs) in one example, although any suitable switching transistors (e.g., bipolar, field-effect, etc., transistors) can be relied upon. The switching devices $S_1$-$S_4$ (also referred to herein as "switches") can be manufactured from a variety of semiconductor materials, including Silicon, III-Nitride materials, and other semiconductor materials. The gates of the switching devices $S_1$-$S_4$ can be coupled to one or more gate drivers, as described below, to direct the flow of power through switching devices $S_1$-$S_4$ (e.g., through the channels of the IGBTs).

The source of the switch $S_1$ is coupled to one end of the capacitor $C_1$. The drain of the switch $S_1$ is coupled to the source of the switch $S_2$, the drain of the switch $S_2$ is coupled to the source of the switch $S_3$, and the drain of the switch $S_3$ is coupled to the source of the switch $S_4$. The drain of the switch $S_2$ and the source of the switch $S_3$ are coupled to another end of the capacitor $C_1$. The drain of the switch $S_2$ and the source of the switch $S_3$ are also coupled to one end of the capacitor $C_2$. The drain of the switch $S_4$ is coupled to another end of the capacitor $C_2$. One end of the branch 110 is coupled at a node between the drain of the switch $S_1$ and the source of the switch $S_2$. Another end of the branch 110 is coupled at a node between the drain of the switch $S_3$ and the source of the switch $S_4$.

Power can be switched, bidirectionally, between capacitors $C_1$ and $C_2$ based on the configuration of the balancing cell 100 shown in FIG. 2A. That is, based on gate drive signals applied to the switching devices $S_1$-$S_4$, in sequence, charge can be transferred from the capacitor $C_1$ to the capacitor $C_2$ or from the capacitor $C_2$ to the capacitor $C_1$. For example, the switching devices $S_1$ and $S_3$ can be turned on and the switching devices $S_2$ and $S_4$ can be turned off during a portion of a switching cycle, to transfer charge through the branch 110 from the capacitor $C_1$ to the capacitor $C_2$. Alternatively, the switching devices $S_2$ and $S_4$ can be turned on and the switching devices $S_1$ and $S_3$ can be turned off during another portion of the switching cycle, to transfer charge through the branch 110 from the capacitor $C_2$ to the capacitor $C_1$. In both cases, the resonant inductor Lr in the branch 110 facilitates soft switching (e.g., slows transitional currents) in the transfer of the charge or power.

Figure 3A:
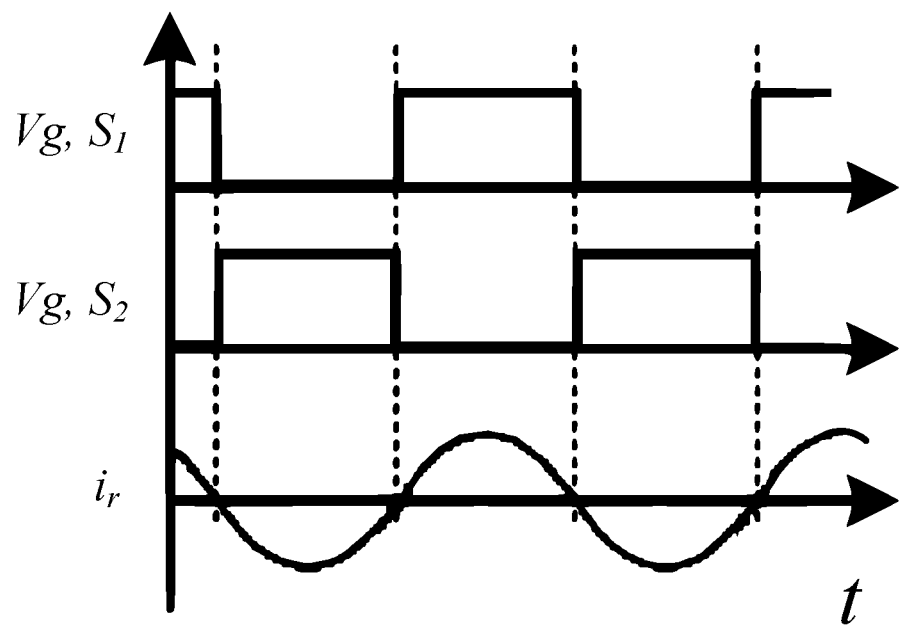
FIG. 3A illustrates example gate control signal and resonant current waveforms, at a 50% duty cycle, for the bidirectional balancing cell shown in FIG. 2A according to aspects of the embodiments described herein.

There are some disadvantages to the configuration of the balancing cell 100 shown in FIG. 2A. For example, with 50% constant duty cycle control of the gate signals, as shown in FIG. 3A, the switching frequency fs of the switching devices S1-S4 should be the same as the resonant frequency fr of the branch 110. Otherwise, balancing cell 100 will not be able to operate with zero-current-switching (ZCS) operation, and the voltage balancing operations can become distorted.

Additionally, when the balancing cell 100 is used in the balancing string 20 shown in FIG. 1, the gate drive timings among the switches in all the balancing cells should be closely coordinated. Otherwise, the voltages among the capacitors in the capacitor string 30 can become unintentionally unbalanced, among other problems. Gate drive timing coordination in the balancing string 20 can be relatively difficult, particularly in the complex electromagnetic interference ("EMI") environment of the power supply 12 with high input voltages Vin and dv/dt of the power supply 12. The coordination may require a central controller, the use of fiber optics to avoid EMI, or other complex and costly implementations to prevent short circuit faults, maintain voltage balancing, and maintain the overall function of the power supply 12.

Figure 2B:
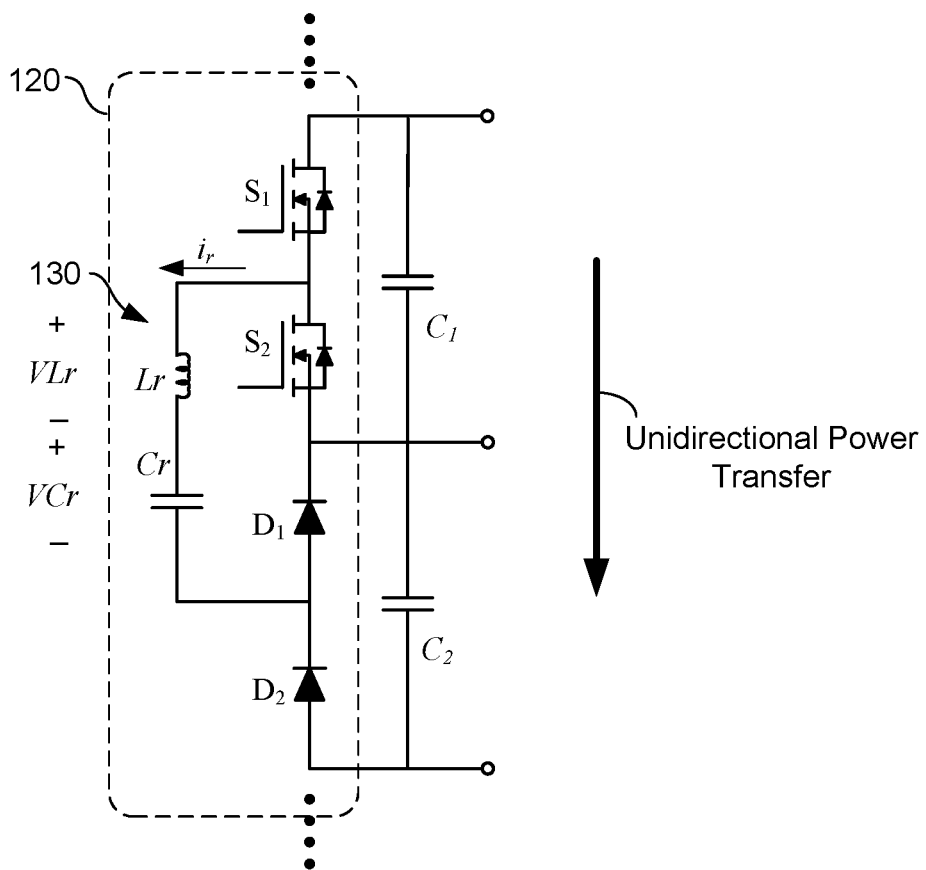
FIG. 2B illustrates an example unidirectional balancing cell according to aspects of the embodiments described herein.

FIG. 2B illustrates an example unidirectional balancing cell 120 according to aspects of the embodiments described herein. The unidirectional balancing cell 120 offers some advantages as compared to the configuration of the balancing cell 100 shown in FIG. 2A, as described below. One or more of the balancing cells 21-23 in the balancing string 20 shown in FIG. 1 can be implemented as the balancing cell 120. The balancing cell 120 includes a first switching device $S_1$, a second switching device $S_2$, a first diode $D_1$, and a second diode $D_2$. The balancing cell 120 also includes a branch 130, including a resonant inductor Lr and a resonant capacitor Cr. The capacitors $C_1$ and $C_2$ are part of a capacitor string, similar to the capacitor string 30 of the power supply 12 shown in FIG. 1.

The switching devices $S_1$ and $S_2$ can be embodied as insulated-gate bipolar transistors (IGBTs) in one example, although any suitable switching transistors (e.g., bipolar, field-effect, etc., transistors) can be relied upon. The gates of the switching devices $S_1$ and $S_2$ can be coupled to one or more gate drivers, as described below, to direct the flow of power through switching devices $S_1$ and $S_2$.

The source of the switch $S_1$ is coupled to one end of the capacitor $C_1$. The drain of the switch $S_1$ is coupled to the source of the switch $S_2$, the drain of the switch $S_2$ is coupled to the cathode of the diode $D_1$, and anode of the diode $D_1$ is coupled to cathode of the diode $D_2$. The drain of the switch $S_2$ and the cathode of the diode $D_2$ are coupled to another end of the capacitor $C_1$. The drain of the switch $S_2$ and the cathode of the diode $D_2$ are also coupled to one end of the capacitor $C_2$. The anode of the diode $D_2$ is coupled to another end of the capacitor $C_2$. One end of the branch 130 is coupled at a node between the drain of the switch $S_1$ and the source of the switch $S_2$. Another end of the branch 130 is coupled at a node between the anode of the diode $D_1$ and the cathode of the diode $D_2$.

Power can be switched, unidirectionally, between the capacitors $C_1$ and $C_2$ based on the configuration of the balancing cell 120 shown in FIG. 2B. That is, based on gate drive signals applied to the switching devices $S_1$ and $S_2$, in sequence, charge can be transferred in a first direction from the capacitor $C_1$ to the capacitor $C_2$. For example, the switch $S_1$ can be turned on and the switch $S_2$ can be turned off during a portion of a switching cycle, to transfer charge through the branch 130 from the capacitor $C_1$ to the capacitor $C_2$. Additionally, the switch $S_2$ can be turned on and the switch $S_1$ can be turned off during another portion of the switching cycle, to complete the transfer of charge through the branch 130 from the capacitor $C_1$ to the capacitor $C_2$. In both cases, the resonant inductor Lr in the branch 130 facilitates soft switching (e.g., slows transitional currents) in the transfer of the charge or power.

The unidirectional balancing cell 120 offers some advantages as compared to the configuration of the balancing cell 100 shown in FIG. 2A. For example, in some applications of the power supply 12, bidirectional operation of the power supply 12 is not always necessary. Thus, as compared to the balancing cell 100 shown in FIG. 2A, the balancing cell 120 shown in FIG. 2B can omit two switching devices and replace them with the diodes $D_1$ and D. In this way, the unidirectional balancing cell 120 is simplified as compared to the bidirectional balancing cell 100, and the power flow direction depends on the configuration of the switches $S_1$ and $S_2$ and the diodes $D_1$ and $D_2$. In addition to the active switching devices, the number of gate drivers and power supplies needed for the gate drives is simplified (e.g., by half) for the balancing cell 120 as compared to the balancing cell 100.

Additionally, in some applications of the power supply 12, the operating voltage (e.g., Vin) is high while the operating current is low. By setting the switching frequency fs of the balancing cell 120 to be higher than the resonant frequency fr of the branch 130, the size of the resonant inductor Lr and resonant capacitor Cr in the branch 130 can be reduced as compared to the resonant inductor Lr and the resonant capacitor Cr in the branch 110 (FIG. 2A). To cope with the unequal values of fr and fs, the switching device turn-on period used for the balancing cell 100 cell shown in FIG. 2A should match half of the LC resonant period for the branch 110, as shown in FIG. 3B, so that the duty cycle matches the resonant components accurately for ZCS operation, which adds complexity for gate control. However, for the topology of the balancing cell 120 cell in FIG. 2B (and in FIG. 2C), the current through the branch 130 will be automatically blocked when it reaches zero by the diodes $D_1$ and $D_2$, so a simpler 50% duty cycle control can still be applied, as shown in FIG. 3C.

Figure 2C:
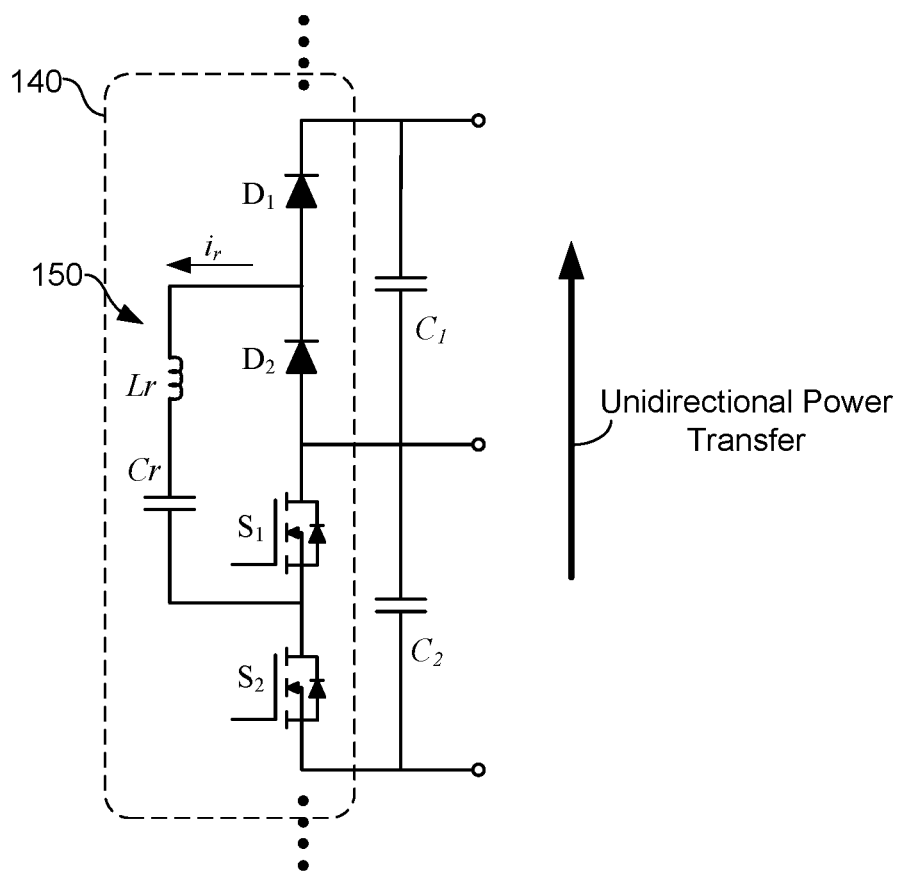
FIG. 2C illustrates another example unidirectional balancing cell according to aspects of the embodiments described herein.
Figure 3B:
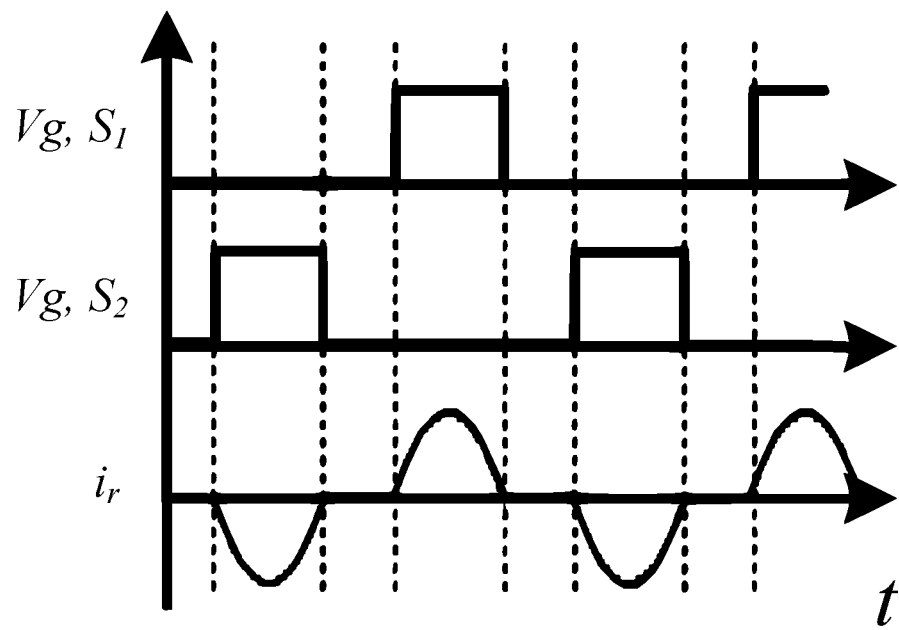
FIG. 3B illustrates example gate control signal and resonant current waveforms for the bidirectional balancing cell shown in FIG. 2A, at a reduce duty cycle below 50%, according to aspects of the embodiments described herein.
Figure 3C:
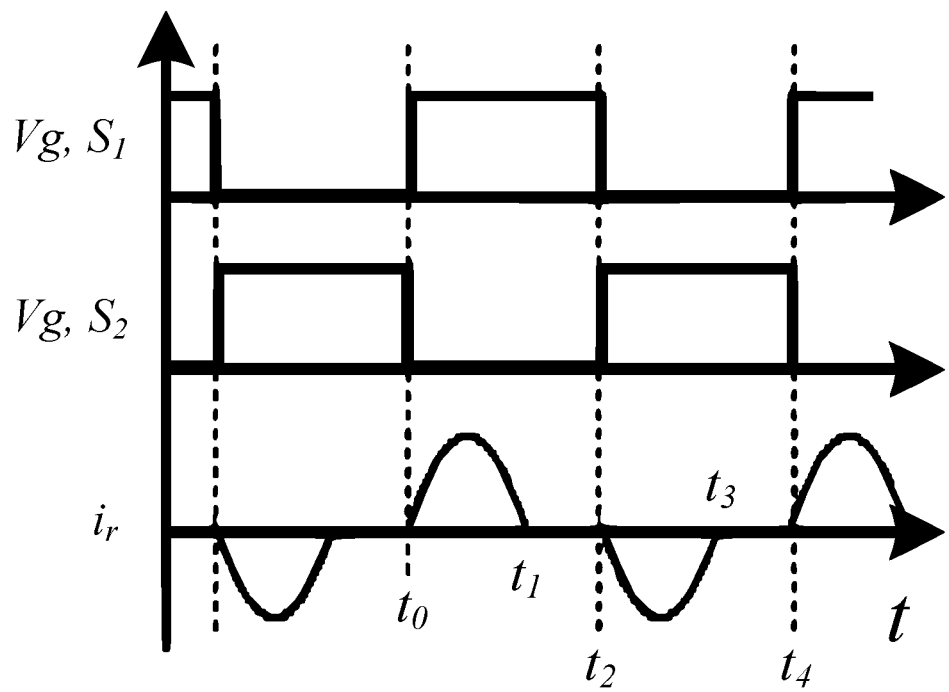
FIG. 3C illustrates example gate control signal and current waveforms for the unidirectional balancing cells shown in FIGS. 2B and 2C, at a reduce duty cycle below 50%, according to aspects of the embodiments described herein.

FIG. 2C illustrates an example unidirectional balancing cell 140 according to aspects of the embodiments described herein. The unidirectional balancing cell 140 offers some advantages as compared to the configuration of the balancing cell 100 shown in FIG. 2A, as described below. One or more of the balancing cells 21-23 in the balancing string 20 shown in FIG. 1 can be implemented as the balancing cell 140. The balancing cell 120 includes a first diode $D_1$, a second diode $D_2$, a first switching device $S_1$, and a second switching device $S_2$. The balancing cell 140 also includes a branch 150, including a resonant inductor Lr and a resonant capacitor Cr. The capacitors $C_1$ and $C_2$ are part of a capacitor string, similar to the capacitor string 30 of the power supply 12 shown in FIG. 1.

The switching devices $S_1$ and $S_2$ can be embodied as insulated-gate bipolar transistors (IGBTs) in one example, although any suitable switching transistors (e.g., bipolar, field-effect, etc., transistors) can be relied upon. The gates of the switching devices $S_1$ and $S_2$ can be coupled to one or more gate drivers, as described below, to direct the flow of power through switching devices $S_1$ and $S_2$.

The cathode of the diode $D_1$ is coupled to one end of the capacitor $C_2$. The anode of the diode $D_1$ is coupled to the cathode of the diode $D_2$. The anode of the diode $D_2$ is coupled to another end of the capacitor $C_1$. The source of the switch $S_1$ is coupled to the anode of the diode $D_2$, the other end of the capacitor $C_1$, and one end of the capacitor $C_2$. The drain of the switch $S_1$ is coupled to the source of the switch $S_2$, and the drain of the switch $S_2$ is coupled to the other end of the capacitor $C_2$. One end of the branch 150 is coupled at a node between the anode of the diode $D_1$ and the cathode of the diode $D_2$. Another end of the branch 130 is coupled at a node between the drain of the switch $S_1$ and the source of the switch $S_2$.

Power can be switched, unidirectionally, between the capacitors $C_1$ and $C_2$ based on the configuration of the balancing cell 140 shown in FIG. 2C. That is, based on gate drive signals applied to the switching devices $S_1$ and $S_2$, in sequence, charge can be transferred in a second direction from the capacitor $C_2$ to the capacitor $C_1$. For example, the switch $S_1$ can be turned on and the switch $S_2$ can be turned off during a portion of a switching cycle, to transfer charge through the branch 150 from the capacitor $C_2$ to the capacitor $C_1$. Additionally, the switch $S_2$ can be turned on and the switch $S_1$ can be turned off during another portion of the switching cycle, to complete the transfer of charge through the branch 150 from the capacitor $C_1$ to the capacitor $C_2$. In both cases, the resonant inductor Lr in the branch 130 facilitates soft switching (e.g., slows transitional currents) in the transfer of the charge or power.

The unidirectional balancing cell 140 offers some advantages as compared to the configuration of the balancing cell 100 shown in FIG. 2A. For example, in some applications of the power supply 12, bidirectional operation of the power supply 12 is not always necessary. Thus, as compared to the balancing cell 100 shown in FIG. 2A, the balancing cell 140 shown in FIG. 2C can omit two switching devices and replace them with the diodes $D_1$ and $D_2$. In this way, the unidirectional balancing cell 140 is simplified as compared to the bidirectional balancing cell 100, and the power flow direction depends on the configuration of the switches $S_1$ and $S_2$ and the diodes $D_1$ and $D_2$. In addition to the active switching devices, the number of gate drivers and power supplies needed for the gate drives is simplified (e.g., by half) for the balancing cell 140 as compared to the balancing cell 100.

Additionally, in some applications of the power supply 12, the operating voltage (e.g., Vin) is high while the operating current is low. By setting the switching frequency fs of the balancing cell 120 to be higher than the resonant frequency fr of the branch 150, the size of the resonant inductor Lr and resonant capacitor Cr in the branch 150 can be reduced as compared to the resonant inductor Lr and the resonant capacitor Cr in the branch 110 (FIG. 2A). To cope with the unequal values of fr and fs, the switching device turn-on period used for the balancing cell 100 cell shown in FIG. 2A should match half of the LC resonant period for the branch 110, as shown in FIG. 3B, so that the duty cycle matches the resonant components accurately for ZCS operation, which adds complexity for gate control. However, for the topology of the balancing cell 140 cell in FIG. 2C, the current through the branch 150 will be automatically blocked when it reaches zero by the diodes $D_1$ and $D_2$, so a simpler 50% duty cycle control can still be applied, as shown in FIG. 3C.

FIG. 3A illustrates example gate control signal and current waveform $i_r$ through the branch 130 for the balancing cell 120 cell shown in FIG. 2B (and also, in extension, to the balancing cell 140 cell shown in FIG. 2C). At time $t_0$, $S_1$ is turned on and $S_2$ is turned off. Current flows from the capacitor $C_1$ to the resonant capacitor Cr in the branch 130 during half of the period until $t_1$, when diodes $D_1$ and $D_2$ block the reverse current. At time $t_2$, $S_1$ is turned off and $S_2$ is turned on. Current flows from the resonant capacitor Cr to the capacitor $C_2$ in half of the period until $t_3$, when diodes $D_1$ and $D_2$ block the reverse current. As shown in FIG. 3C, the resonant frequency fr (e.g., $\frac{1}{2}(t_1-t_0)$) is higher than the switching frequency fs (e.g., $1(t_4-t_0)$), which means lower values of Lr and Cr (and smaller Lr and Cr) and higher system power density.

Figure 4:
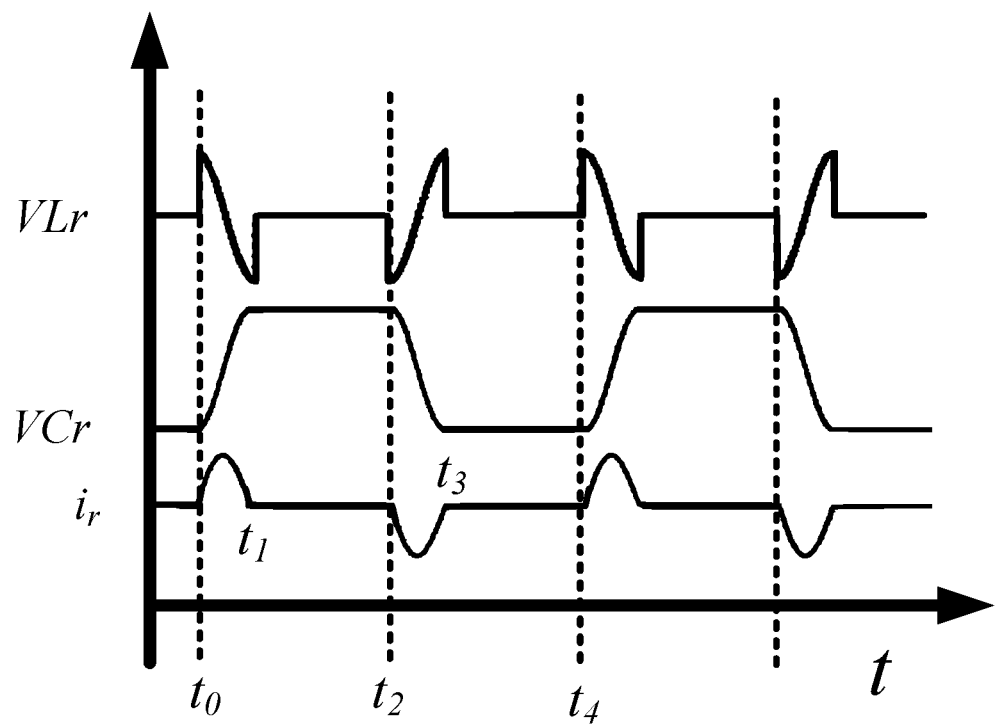
FIG. 4 illustrates example voltage and current waveforms for the unidirectional balancing cells shown in FIGS. 2B and 2C, at a reduce duty cycle below 50%, according to aspects of the embodiments described herein.

FIG. 4 illustrates example voltage and current waveforms for the unidirectional balancing cells shown in FIGS. 2B and 2C, at a reduced duty cycle below 50%, according to aspects of the embodiments described herein. Similar to the example in FIG. 3C, at time $t_0$, $S_1$ is turned on and $S_2$ is turned off. Current flows from the capacitor $C_1$ to the resonant capacitor Cr in the branch 130 during half of the period until $t_1$, when diodes $D_1$ and $D_2$ block the reverse current. At time $t_2$, $S_1$ is turned off and $S_2$ is turned on. Current flows from the resonant capacitor Cr to the capacitor $C_2$ in half of the period until $t_3$, when diodes $D_1$ and $D_2$ block the reverse current. The resonant inductor Lr and a resonant capacitor Cr in the example shown in FIG. 4 are different than in FIG. 3C. However, as also shown in FIG. 4, the resonant frequency fr (e.g., $\frac{1}{2}(t_1-t_0)$) is higher than the switching frequency fs (e.g., $1/(t_4-t_0)$), which means lower values of Lr and Cr (and smaller Lr and Cr) and higher system power density.

Figure 5A:
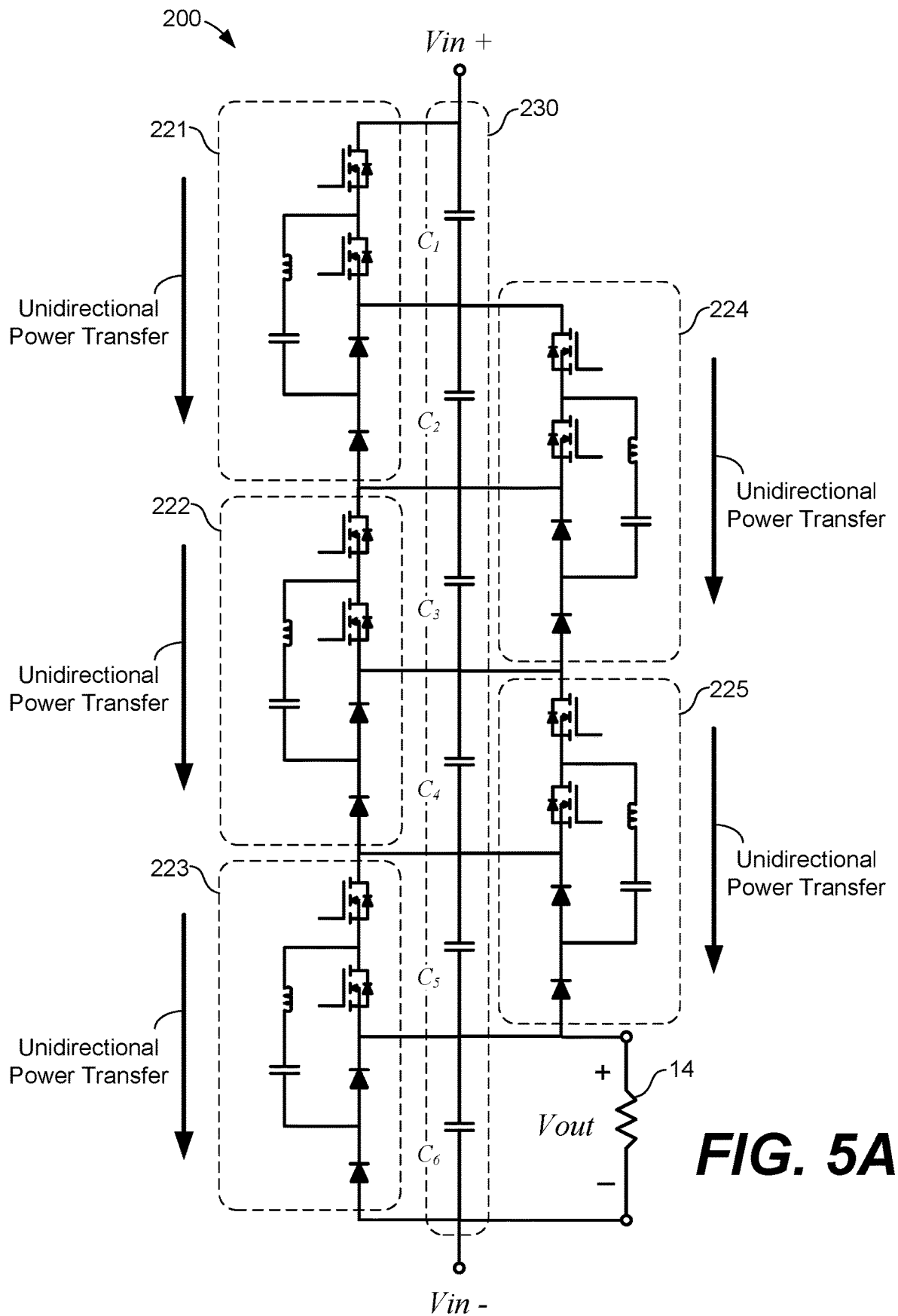
FIG. 5A illustrates an interleaved arrangement of unidirectional balancing cells and series-connected capacitors of a power supply according to aspects of the embodiments described herein.

FIG. 5A illustrates balancing cells 221-225 and series-connected capacitors 230 of a step-down power supply 200 according to aspects of the embodiments described herein. Each of the balancing cells 221-225 is similar to the balancing cell 120 shown in FIG. 2B. The series-connected capacitors 230 include capacitors $C_1$-$C_6$. A load 14 is also shown in FIG. 5A, coupled across the capacitor $C_5$. Bulk DC power can be provided to the power supply 200, across Vin. As compared to the input voltage Vin, the power supply 200 provides a stepped-down output voltage Vout across the load 14.

Figure 5B:
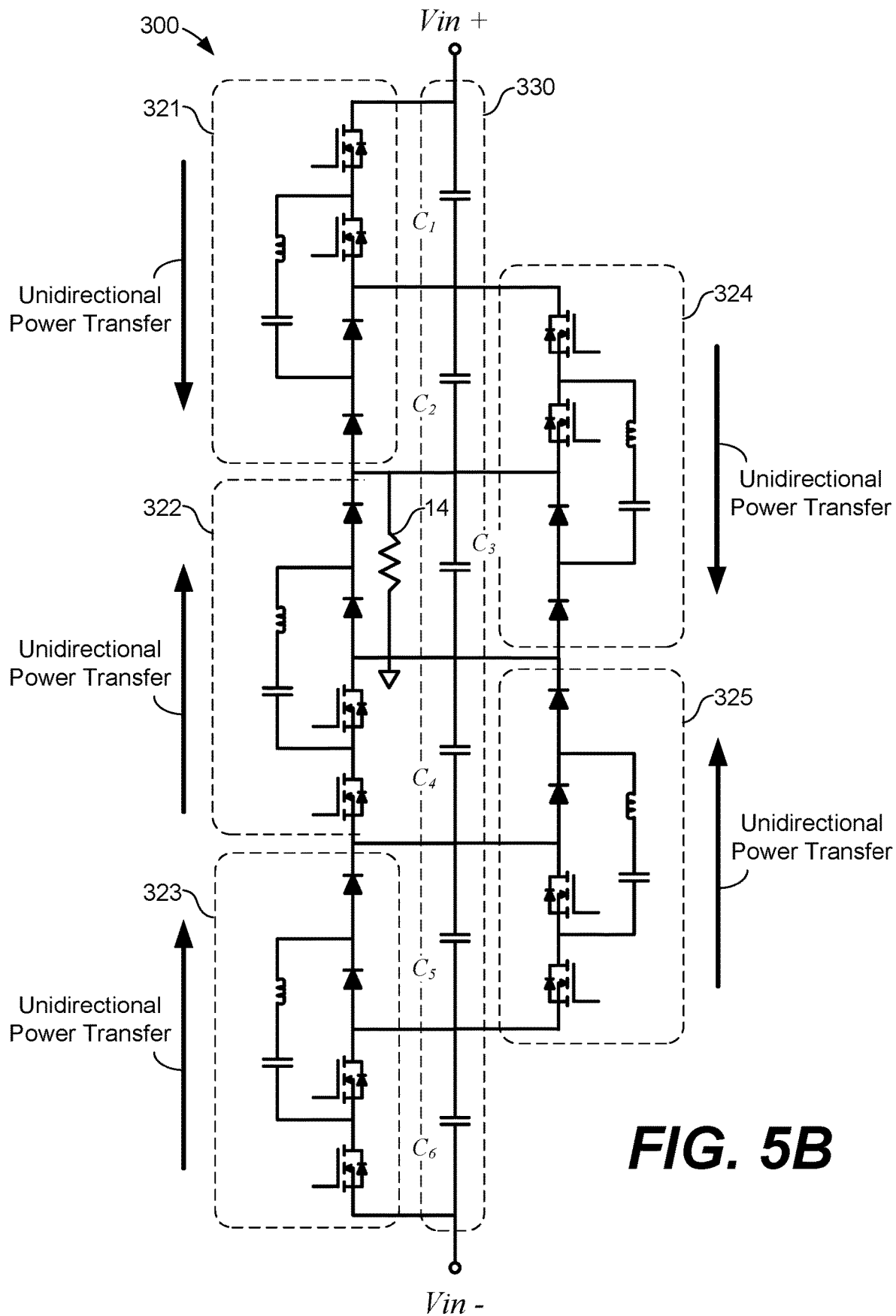
FIG. 5B illustrates another interleaved arrangement of unidirectional balancing cells and series-connected capacitors of a power supply according to aspects of the embodiments described herein.

The power supply 200 is illustrated to show one example of an arrangement of the unidirectional balancing cells shown in FIGS. 2B. Other power supplies including other arrangements of the unidirectional balancing cells are within the scope of the embodiments, and another example is shown in FIG. 5B. The power supply 200 is not exhaustively illustrated, and the power supply 200 can include other components. For example, the power supply 200 can include additional balancing cells, additional capacitors, and other components depending on the application for use of the power supply 200. Additional balancing cells and capacitors can be included, for example, for greater step-down ratios (i.e., larger Vin/Vout). Additionally, each of the balancing cells 221-225 can include an auxiliary power supply and gate driver circuitry, as described below, although not shown. Additionally, one or more of the components of the power supply 200 shown in FIG. 5A can be omitted, moved, or replaced. For example, the load 14 is illustrated in FIG. 5A as a resistive load, but the output of the power supply 200 can be coupled to other types of loads, including later-stage power supplies or power converters, gate drivers, sensors, controllers, and other loads. The load 14 or other loads can also be coupled across one or more other one(s) of the capacitors $C_1$-$C_6$ in some cases.

The balancing cells 221-225 are interleaved among the series-connected capacitors 230 in the power supply 200 shown in FIG. 5A. It is not necessary to interleave balancing cells in other configurations of modular multilevel converters, such as power supplies or converters including only the bidirectional balancing cells shown in FIG. 2A, because the bidirectional balancing cells do not include diodes. Thus, the interleaved configuration shown in FIG. 5A is tailored for the use of unidirectional power cells.

In the interleaved configuration, the pair of switching transistors of the balancing cell 221 is coupled across (i.e., in parallel with) the capacitor $C_1$. The pair of diodes of the balancing cell 221 is coupled across (i.e., in parallel with) the capacitor $C_2$. The pair of switching transistors of the balancing cell 224 is also coupled across the capacitor $C_2$.

The pair of switching transistors of the balancing cell 222 is coupled across the capacitor $C_3$. The pair of diodes of the balancing cell 224 is also coupled across the capacitor $C_3$. The pair of diodes of the balancing cell 222 is coupled across the capacitor $C_4$. The pair of switching transistors of the balancing cell 225 is also coupled across the capacitor $C_4$. The pair of switching transistors of the balancing cell 223 is coupled across the capacitor $C_5$. The pair of diodes of the balancing cell 225 is also coupled across the capacitor $C_5$. The pair of diodes of the balancing cell 223 is coupled across the capacitor $C_6$.

In operation, the balancing cells 221-225 are configured to switch charge from the input of the power supply 200 through the capacitors $C_1$-$C_6$ in the capacitor string 230. Through switching operations performed by the balancing cells 221-225, the balancing cells 221-225 are configured to move charge among the capacitors $C_1$-$C_6$, individually, down to the capacitor $C_6$, where the load 14 is coupled. As compared to the input voltage Vin, the power supply 200 provides an output voltage Vout of lower potential (i.e., of lower voltage) across the capacitor $C_6$.

FIG. 5B illustrates another interleaved arrangement of unidirectional balancing cells 321-325 and series-connected capacitors 330 of a power supply 300 according to aspects of the embodiments described herein. The balancing cells 321 and 322 are similar to the balancing cell 120 shown in FIG. 2B. The balancing cells 323-325 are similar to the balancing cell 140 shown in FIG. 2C. The series-connected capacitors 330 include capacitors $C_1$-$C_6$. A load 14 is also shown in FIG. 5B, coupled across the capacitor $C_3$. Bulk DC power can be provided to the power supply 300, across Vin. As compared to the input voltage Vin, the power supply 300 provides a stepped-down output voltage Vout (not shown in FIG. 5B) across the load 14. The ground potential of the output voltage Vout resides directly on a mid-point of the series-connected capacitors 330. Since the mid-point is designed to be a ground reference of the power supply 300, isolation is unnecessary when the power supply 300 is used as a first stage.

The power supply 300 is illustrated to show one example of an arrangement of the unidirectional balancing cells shown in FIGS. 2B and 2C. Other power supplies including other arrangements of the unidirectional balancing cells are within the scope of the embodiments. The power supply 300 is not exhaustively illustrated, and the power supply 300 can include other components. For example, the power supply 300 can include additional balancing cells, additional capacitors, and other components depending on the application for use of the power supply 300. Additional balancing cells and capacitors can be included, for example, for greater step-down ratios (i.e., larger Vin/Vout). Additionally, each of the balancing cells 321-325 can include an auxiliary power supply and gate driver circuitry, as described below, although not shown. Additionally, one or more of the components of the power supply 300 shown in FIG. 5B can be omitted, moved, or replaced. For example, the load 14 is illustrated in FIG. 5B as a resistive load, but the output of the power supply 300 can be coupled to other types of loads, including later-stage power supplies or power converters, gate drivers, sensors, controllers, and other loads. The load 14 or other loads can also be coupled across one or more other one(s) of the capacitors $C_1$-$C_6$ in some cases.

The balancing cells 321-325 are interleaved among the series-connected capacitors 330 in the power supply 300 shown in FIG. 5B. It is not necessary to interleave balancing cells in other configurations of modular multilevel converters, such as power supplies or converters including only the bidirectional balancing cells shown in FIG. 2A, because the bidirectional balancing cells do not include diodes. Thus, the interleaved configuration shown in FIG. 5B is tailored for the use of unidirectional power cells.

In the interleaved configuration, the pair of switching transistors of the balancing cell 321 is coupled across the capacitor $C_1$. The pair of diodes of the balancing cell 321 is coupled across the capacitor $C_2$. The pair of switching transistors of the balancing cell 324 is also coupled across the capacitor $C_2$. The pair of diodes of the balancing cell 322 is coupled across the capacitor $C_3$. The pair of diodes of the balancing cell 324 is also coupled across the capacitor $C_3$. The pair of switching transistors of the balancing cell 322 is coupled across the capacitor $C_4$. The pair of diodes of the balancing cell 325 is also coupled across the capacitor $C_4$. The pair of diodes of the balancing cell 323 is coupled across the capacitor $C_5$. The pair of switching transistors of the balancing cell 325 is also coupled across the capacitor $C_5$. The pair of switching transistors of the balancing cell 323 is coupled across the capacitor $C_6$.

In operation, the balancing cells 321-325 are configured to switch charge from the input of the power supply 300 through the capacitors $C_1$-$C_6$ in the capacitor string 330. Through switching operations performed by the balancing cells 321-325, the balancing cells 321-325 are configured to move charge among the capacitors $C_1$-$C_6$, individually, to the capacitor $C_3$, where the load 14 is coupled. As compared to the input voltage Vin, the power supply 300 provides an output voltage Vout of lower potential (i.e., of lower voltage) across the capacitor $C_3$.

Overall, compared to a configuration including only bidirectional balancing cells, where the balancing cells can be connected directly in series (i.e., end to end) with each other, the embodiments shown in FIGS. 5A and 5B rely upon an interleaved configuration. Depending on where the load 14 is coupled, one or both of the two different types of unidirectional balancing cells shown in FIGS. 2B and 2C can be used in some cases to transfer power among the capacitors $C_1$-$C_6$ to the load 14. For example, if the load 14 is coupled across the capacitor $C_6$ as shown in FIG. 5A, a power supply can be implemented using only the unidirectional balancing cells shown in FIG. 2B. If the load 14 were coupled across the capacitor $C_1$, the power supply can be implemented using only the unidirectional balancing cells shown in FIG. 2C. If the load 14 is coupled across one of the capacitors $C_2$-$C_5$, the power supply can be implemented using a combination of the unidirectional balancing cells shown in FIGS. 2A and 2B, an example of which is shown in FIG. 5B.

For n series-connected capacitors in the capacitor string, the transfer ratio is n:1. In a configuration including only bidirectional balancing cells, 2n switching transistors are needed. In the interleaved configurations including only unidirectional balancing cells, 2(n−1) switching transistors and 2(n−1) diodes are needed. The interleaved configurations not only reduce the number of active devices and the associated gate drivers needed, but it also simplifies the gate timings and control needed for the individual balancing cells, as the balancing cells can operate with gate timings that do not require strict synchronization.

In some cases, the interleaved configurations can only require interlocking between the two switches within a cell. There is no timing synchronization required for gate signals between different balancing cells, and the switching frequency, resonant frequency, and gate signal phases can all be different among the balancing cells. In other words, the gate signals for each balancing cell are independent and separated, which simplifies the control system so that a local oscillator can be sufficient for each balancing cell to generate gate switching signals. Additionally, multiple cells can be stacked in an interleaved way for higher voltage transfer ratios, and each of the balancing cells only requires a local oscillator for gate switching signals. No central controller or communication between balancing cells are required, and the interleaved configurations offers a better scalable solution.

Figure 6:
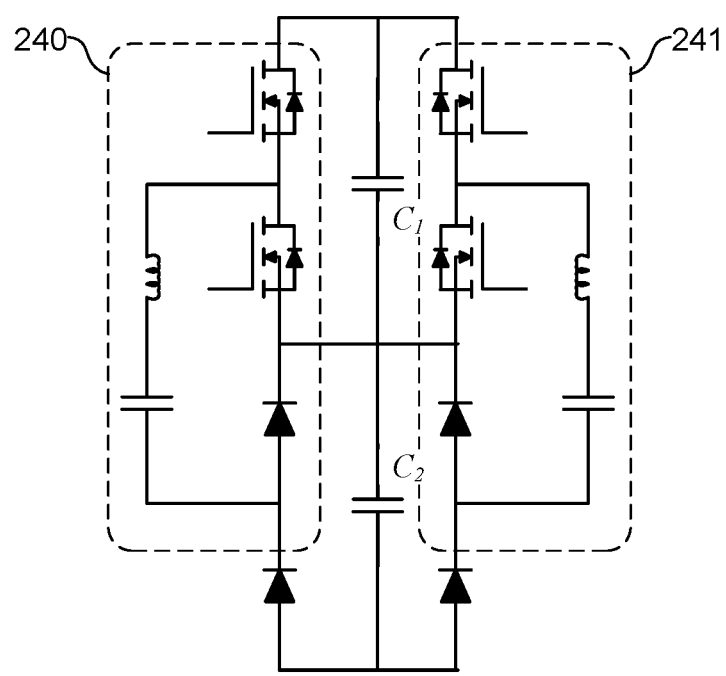
FIG. 6 illustrates an example of a pair of parallelized unidirectional balancing cells according to aspects of the embodiments described herein.

Balancing cells in the interleaved configurations can also be parallelized for current sharing. For example, the balancing cell 321 shown in FIG. 5B can be parallelized (e.g., doubled, tripled, etc.), so that the switching transistors of the parallelized balancing cells are coupled across the capacitor $C_1$ and the diodes of the parallelized balancing cells are coupled across the capacitor $C_2$, and the other balancing cell 322-325 can be parallelized in a similar way. In the context of parallelization, FIG. 6 illustrates an example of a pair of parallelized unidirectional balancing cells 240 and 241. The balancing cells 240 and 241 are parallelized with the capacitors $C_1$ and $C_2$, and any number of balancing cells can be parallelized with the capacitors $C_1$ and $C_2$ for current sharing. The control for the gate switch timings of the parallelized balancing cells 240 and 241 can be disconnected, similar to the control for other unidirectional balancing cells described herein.

As shown in the FIGS. 3C and 4, the resonant current $i_r$ can describe the power flow and define the loss of the power supplies or converters described herein. From a charge balance analysis, the amplitude of $i_r$ can be calculated, since the amount of charge flowing into the resonant capacitor Cr when $S_1$ is on must be equal to the charge flowing to the load in one switching period, as follows:

$$\int_{t_0}^{t_0+T_s} \hat{i}_r \sin(\omega_r t) dt = I_{Load} \cdot T_s. \quad (1)$$

Thus, $$\hat{i}_r = \frac{1}{2\sqrt{L_r C_r} f_s} \cdot I_{Load}. \quad (2)$$

From Equation (2), the resonant current $i_r$ is proportional to the load current, since heavier loads require higher capacitor-balancing currents. Also, with larger resonant component values (e.g., larger $C_r$ and $L_r$), the amplitude of the resonant current $i_r$ is reduced. This brings a trade-off between power density and efficiency, because larger products of LC can reduce the current and loss but lead to increased LC component size. Further, a high switching frequency $f_s$ can also reduce the resonant current $i_r$ because charge is moving from one capacitor to another more frequently for a given time period. The switching frequency thus also faces a trade-off between switching loss and conduction amplitude.

Resistance $R_r$ in the resonant branch is inevitable, and it includes the on-resistance of the switching transistors and the diodes and the equivalent series resistance ("ESR") of the resonant inductor Lr and capacitor. The damping factor $\zeta$ can be calculated as follows:

$$\zeta = \frac{R_r}{2}\sqrt{\frac{C_r}{L_r}}. \quad (3)$$

Figure 7:
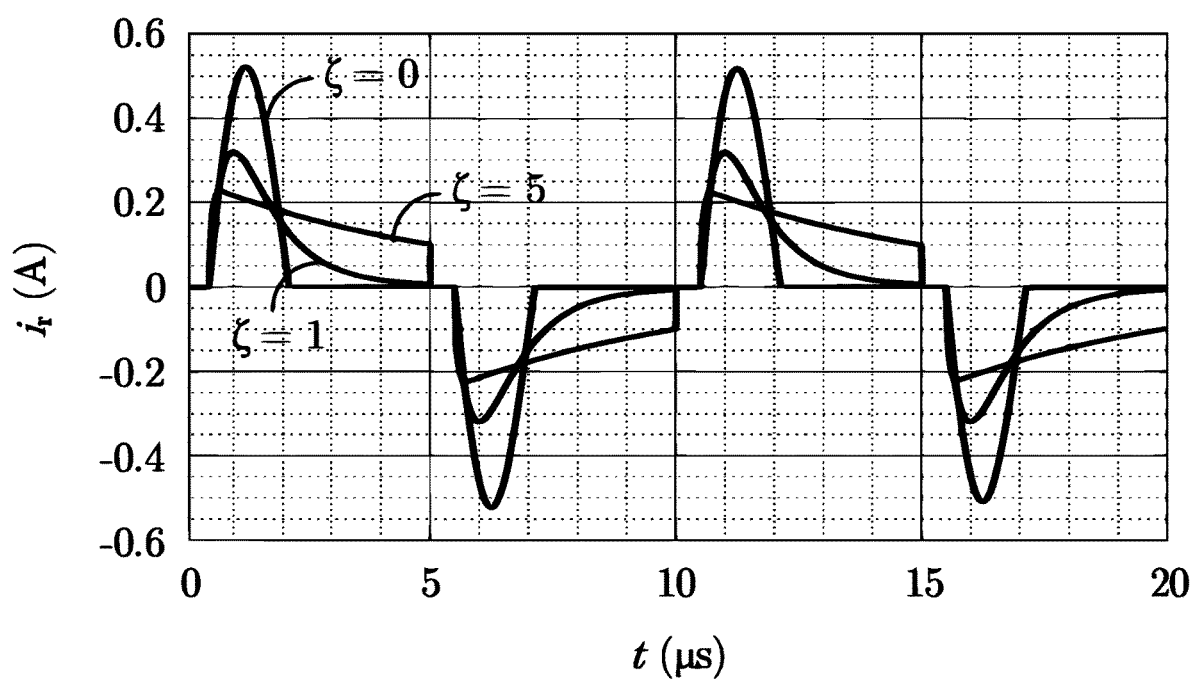
FIG. 7 illustrates resonant currents in unidirectional balancing cells with the same load under different damping factors according to aspects of the embodiments described herein.

FIG. 7 illustrates resonant currents $i_r$ in unidirectional balancing cells with the same load under different damping factors according to aspects of the embodiments described herein. When $\zeta=0$, the resonant current $i_r$ is in an ideal sinusoidal shape. When the damping factor is higher, the current envelope will be flattened with a longer resonant period. If the damping factor is as high as $\zeta=5$, the current will be turned off before it drops to zero, which will cause the switching transistors to lose the ZCS turn-off and increase switching loss. Several approaches can be used to reduce the damping factor of the resonance. First, the resistance of the resonant branch should be minimized, so devices with low on resistances and components with low ESR are preferred. Second, for a fixed product of $C_r$ and $L_r$ calculated by the amplitude of the resonant current $i_r$ in Equation (2), $C_r$ should not be too large and $L_r$ should not be too small.

FIG. 4 shows voltages waveforms across the resonant components $L_r$ and $C_r$. The maximum voltage across $C_r$ and $L_r$ are:

$$v_{Cr-max} = V_o + v_{Lr-max} \text{ and} \quad (4)$$

$$v_{Lr-max} = \omega_r L_r \hat{i}_r = \frac{\omega_r L_r}{2\sqrt{L_r C_r} f_s} I_{Load} = \frac{1}{2 C_r f_s} I_{Load}. \quad (5)$$

For a fixed product of Cr and $L_r$, Cr should not be too small. Otherwise, the voltage across $L_r$ will be too large. Therefore, the product of $L_r$ and $C_r$ should be calculated according to the optimization between conduction loss and switching loss. After this product is fixed, the damping factor will set an upper limit for $C_r$, and the voltage stress of the resonant components the set a lower limit for $C_r$.

For n capacitors in series ($C_1, C_2, \ldots, C_m, \ldots C_n$), n−1 unidirectional balancing cells are needed for voltage balancing. Assuming a load is in parallel with the $m^{th}$ capacitor, the current amplitude of the $p^{th}$ cell ($p_{max}$=n1) will be:

$$\hat{i}_{rp} = \begin{cases} \frac{2p}{n}\hat{i}_r, & p < m \\ \frac{2(n-p)}{n}\hat{i}_r, & p \geq m \end{cases}, \quad (6)$$

where $I_r$ is calculated from Equation (2). For example, for the case shown in FIG. 5B, there are six dc-link capacitors in the series-connected capacitors 330, five balancing cells 321-325, and the load 14 in parallel with $C_3$ (n=6, m=3). Thus, the resonant current amplitude for each balancing cells can be calculated as:

$$\hat{i}_{r1} = \frac{2}{6}\hat{i}_r, \hat{i}_{r2} = \frac{4}{6}\hat{i}_r, \hat{i}_{r3} = \frac{6}{6}\hat{i}_r, \hat{i}_{r4} = \frac{4}{6}\hat{i}_r, \hat{i}_{r5} = \frac{2}{6}\hat{i}_r. \quad (7)$$

The examples described herein provide various improvements over prior voltage-balancing circuits for power supplies. With the use of unidirectional balancing cells and interleaved configurations, the number of active devices and driving circuits is reduces. Also, the LC resonant frequency can be decoupled from the switching frequency. In the proposed examples, the resonant frequency is much higher than the switching frequency, which permits smaller LC components and increases system power density. Additionally, the examples provide an improved configuration in which balancing cells are connected interleaved configurations way rather than direct series stacking. Thus, the balancing cells are self-governed and decoupled from each other. The gate signals and resonant frequencies can both be different among the balancing cells, which eliminates the need for mutual communication and feedback control. The examples also lead to improved reliability and simplicity, making the solutions fully scalable and flexible for different voltage levels.

Auxiliary power is needed for gate drive control of the switches in each balancing cell. However, the power needed for gate drive control can be less than 1 W, for example, or less in some cases. With this low power rating but higher density requirement, a number of different solutions can be considered compared. The simplest approach can be to use a resistive voltage divider across a pair of the capacitors in the series-connected capacitor string, with auxiliary power being tapped at the midpoint of the voltage divider. However, the efficiency of resistive voltage dividers is not optimal. Also, the output voltage for such resistive voltage dividers will change under different dc-link voltages, which does not guarantee a wide input range operation for the balancing cell. A linear voltage regulator can be relied upon to solve the wide input range problem, but the efficiency is still relatively low. Other approaches, such as using a power-over-fiber solution with a laser to transmit power offer insulation and isolation, but the size and cost of laser generators are significant drawbacks. Other, isolated DC-DC power supplies and converters powered from the output of the power supply itself can also be used, but they are relatively large and costly and lack scalability.

Figure 8:
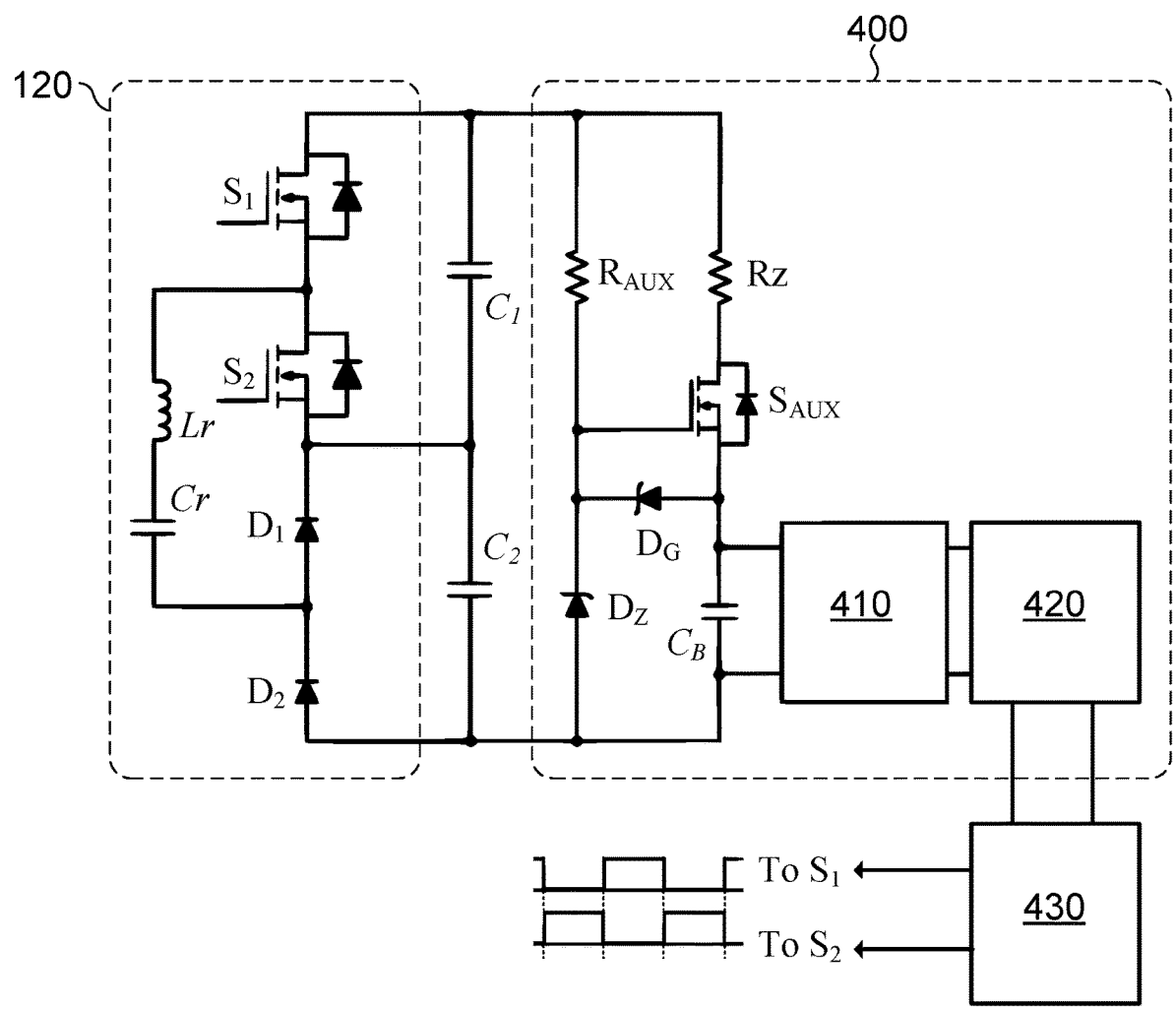
FIG. 8 illustrates an example solution for an auxiliary power supply for gate control of the unidirectional balancing cells according to aspects of the embodiments described herein.

Considering the needs for auxiliary power, FIG. 8 illustrates an example solution for an auxiliary power supply for gate control of the unidirectional balancing cells according to aspects of the embodiments described herein. An auxiliary power supply 400 for the balancing cell 120 is shown in FIG. 8. Each balancing cell in the examples described herein, including the examples shown in FIGS. 5A and 5B, can include an auxiliary power supply similar to the auxiliary power supply 400.

The auxiliary power supply 400 includes a linear regulator, a buck converter 410, and an isolated DC-DC converter 420. A gate controller 430 is also shown in FIG. 8. The linear power supply includes an auxiliary resistor $R_{AUX}$, a series resistor $R_Z$, a follower transistor $S_{AUX}$, a Zener diode $D_Z$, a Zener diode $D_G$, and a capacitor $C_B$, as shown. The $R_{AUX}$, $D_Z$, and $D_G$ components establish the gate voltage for the transistor $S_{AUX}$, and the transistor $S_{AUX}$ supplies current to charge the capacitor $C_B$. The linear regulator is relatively less efficient than the buck converter 410 and the isolated DC-DC converter 420, but the linear regulator is self-biasing and self-starting, to charge the capacitor $C_B$. The linear regulator provides a first voltage step-down from the full potential across the capacitors $C_1$ and $C_2$ to a lower potential across the capacitor $C_B$, which is provided as input to the buck converter 410. The buck converter 410 can be embodied as any type of buck converter, and it provides a second voltage step-down to the isolated DC-DC converter 420. The isolated DC-DC converter 420 can be embodied as any isolated DC-DC converter, to further reduce the voltage output from the buck converter 410 to a voltage for the gate controller 430.

The gate controller 430 can be embodied as control circuitry to provide the gate drive control signals to the switching transistors S1 and S2 of the balancing cell 120 at a switching frequency fs. The gate controller 430 can include a simple oscillator or RC circuit, for example, although more complicated gate drive controllers can be relied upon if needed. Thus, in some cases, the gate controller 430 can be embodied as a digital controller with or without feedback from other systems. In any case, the switching frequency fs can be established by the gate controller 430 independently from the other balancing cells according to the examples described herein.

The features, structures, or characteristics described above may be combined in one or more embodiments in any suitable manner, and the features discussed in the various embodiments are interchangeable, if possible. In the foregoing description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although relative terms such as "above," "below," "upper," "lower," "top," "bottom," "right," "left," "input," and "output" may be used to describe the relative spatial relationships of certain components or structural features, the terms are used for convenience in the examples. It should be understood that if a device or component is turned upside down, the "upper" component will become a "lower" component. When two components are described as being "coupled to" each other, the components can be electrically coupled to each other, with or without other components being electrically coupled and intervening between them. When two components are described as being "directly coupled to" each other, the components can be electrically coupled to each other, without other components being electrically coupled between them.

Terms such as "a," "an," "the," and "said" are used to indicate the presence of one or more elements and components. The terms "comprise," "include," "have," "contain," and their variants are used to be open ended and may include or encompass additional elements, components, etc., in addition to the listed elements, components, etc., unless otherwise specified. The terms "first," "second," etc. are used as distinguishing labels in some cases, rather than a limitation of the number of the objects, unless otherwise specified.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. A step-down power supply, comprising:
an input and an output;
a string of series-connected capacitors; and
a plurality of unidirectional balancing cells coupled to capacitors in the string of series-connected capacitors, wherein:
each balancing cell among the plurality of unidirectional balancing cells comprises a pair of switching transistors, a pair of diodes, and a balancing branch coupled between the pair of switching transistors and the pair of diodes;
the pair of switching transistors of a first balancing cell among the plurality of unidirectional balancing cells is coupled in parallel with a first capacitor of the string of series-connected capacitors; and
the pair of diodes of a second balancing cell among the plurality of unidirectional balancing cells is also coupled in parallel with the first capacitor of the string of series-connected capacitors.

2. The step-down power supply of claim 1, wherein the pair of switching transistors are insulated-gate bipolar transistors.

3. The step-down power supply of claim 1, wherein:
the pair of switching transistors of the second balancing cell is coupled in parallel with a second capacitor in the string of series-connected capacitors; and
the pair of diodes of the first balancing cell is coupled in parallel across a second capacitor in the string of series-connected capacitors.

4. The step-down power supply of claim 1, wherein:
the first balancing cell among the plurality of unidirectional balancing cells is configured to transfer power, unilaterally, in a first direction among at least two capacitors in the string of series-connected capacitors; and
the second balancing cell among the plurality of unidirectional balancing cells is configured to transfer power, unilaterally, in a second direction among at least two capacitors in the string of series-connected capacitors, the first direction being different from the second direction.

5. The step-down power supply of claim 1, wherein the plurality of unidirectional balancing cells are interleaved among the string of series-connected capacitors.

6. The step-down power supply of claim 1, wherein the output is coupled to a load.

7. The step-down power supply of claim 1, further comprising an auxiliary power supply for the first balancing cell or the second balancing cell among the plurality of unidirectional balancing cells.

8. The step-down power supply of claim 7, wherein the auxiliary power supply comprises a linear voltage regulator and a buck converter.

9. The step-down power supply of claim 8, wherein the auxiliary power supply further comprises an isolated DC-DC converter.

10. The step-down power supply of claim 1, further comprising an auxiliary power supply for each balancing cell among the plurality of unidirectional balancing cells.

11. The step-down power supply of claim 1, further comprising:
a first gate controller for the first balancing cell among the plurality of unidirectional balancing cells; and
a second gate controller for the second balancing cell among the plurality of unidirectional balancing cells, wherein the first gate controller generates switching control signals for switching the pair of switching transistors in the first balancing cell independently of the second gate controller.

12. The step-down power supply of claim 1, further comprising:
a first gate controller for the first balancing cell among the plurality of unidirectional balancing cells; and
a second gate controller for the second balancing cell among the plurality of unidirectional balancing cells, wherein the first gate controller generates switching control signals at a first switching frequency and the second gate controller generates switching control signals at a second switching frequency different from the first switching frequency.

13. The step-down power supply of claim 1, further comprising:
a first gate controller for the first balancing cell among the plurality of unidirectional balancing cells, wherein:
the first gate controller generates switching control signals at a first switching frequency;
the balancing branch of the first balancing cell comprises an inductor; and
the first switching frequency is decoupled from a resonant frequency of the balancing branch of the first balancing cell.

14. A step-down power supply, comprising:
a string of series-connected capacitors; and
a plurality of unidirectional balancing cells coupled to capacitors in the string of series-connected capacitors, wherein:
each balancing cell among the plurality of unidirectional balancing cells comprises a pair of switching transistors, a pair of diodes, and a balancing branch coupled between the pair of switching transistors and the pair of diodes;
the pair of switching transistors of a first balancing cell among the plurality of unidirectional balancing cells is coupled in parallel with a first capacitor of the string of series-connected capacitors; and
the pair of diodes of a second balancing cell among the plurality of unidirectional balancing cells is also coupled in parallel with the first capacitor of the string of series-connected capacitors.

15. The step-down power supply of claim 14, wherein:
the first balancing cell among the plurality of unidirectional balancing cells is configured to transfer power, unilaterally, in a first direction among at least two capacitors in the string of series-connected capacitors; and
the second balancing cell among the plurality of unidirectional balancing cells is configured to transfer power, unilaterally, in a second direction among at least two capacitors in the string of series-connected capacitors, the first direction being different than the second direction.

16. The step-down power supply of claim 14, wherein the plurality of unidirectional balancing cells are interleaved among the string of series-connected capacitors.

17. The step-down power supply of claim 14, further comprising an auxiliary power supply for the first balancing cell or the second balancing cell among the plurality of unidirectional balancing cells, the auxiliary power supply comprising a linear voltage regulator and a buck converter.

18. The step-down power supply of claim 14, further comprising:
a first gate controller for the first balancing cell among the plurality of unidirectional balancing cells; and
a second gate controller for the second balancing cell among the plurality of unidirectional balancing cells, wherein the first gate controller generates switching control signals for the pair of switching transistors in the first balancing cell independently of the second gate controller.

19. The step-down power supply of claim 14, further comprising:
a first gate controller for the first balancing cell among the plurality of unidirectional balancing cells; and
a second gate controller for the second balancing cell among the plurality of unidirectional balancing cells, wherein the first gate controller generates switching control signals at a first switching frequency and the second gate controller generates switching control signals at a second switching frequency different from the first switching frequency.

20. The step-down power supply of claim 6, wherein the load is a resistive load, a later-stage power supply, a power converter, a gate driver, a sensor, or a controller.

* * * * *